United States Patent
Skilbeck

(10) Patent No.: US 6,213,208 B1
(45) Date of Patent: Apr. 10, 2001

(54) THREE COMPONENT SEPARATION IN AN OIL WELL

(75) Inventor: Frank Skilbeck, Gloucester (GB)

(73) Assignee: Baker Hughes Limited, London (GB)

(*) Notice: Subject to any disclaimer, the term of this patent is extended or adjusted under 35 U.S.C. 154(b) by 0 days.

(21) Appl. No.: 09/043,526

(22) PCT Filed: Sep. 17, 1996

(86) PCT No.: PCT/GB96/02282

§ 371 Date: Jun. 24, 1998

§ 102(e) Date: Jun. 24, 1998

(87) PCT Pub. No.: WO97/11254

PCT Pub. Date: Mar. 27, 1997

(30) Foreign Application Priority Data

Sep. 22, 1995 (GB) .................................................. 9519339

(51) Int. Cl.[7] .............................. E21B 43/38; E21B 43/40
(52) U.S. Cl. ...................... 166/265; 166/105.1; 166/369; 210/512.2; 210/170
(58) Field of Search ................................ 166/313, 106, 166/265, 105.1, 369; 210/512.2, 788, 787, 512.1, 747, 170; 405/128

(56) References Cited

U.S. PATENT DOCUMENTS

| | | | |
|---|---|---|---|
| 3,737,037 | * 6/1973 | Bone, III | 210/73 |
| 3,764,008 | * 10/1973 | Darley et al. | 210/73 |
| 3,860,019 | * 1/1975 | Teague | 134/109 |
| 4,453,960 | * 6/1984 | Andrepont | 62/542 |
| 4,793,408 | 12/1988 | Miffre | 166/53 |
| 4,960,525 | * 10/1990 | Dalby et al. | 210/788 |
| 5,296,153 | 3/1994 | Peachey | 210/787 |
| 5,344,255 | * 9/1994 | Toor | 405/128 |
| 5,350,525 | * 9/1994 | Shaw et al. | 210/744 |
| 5,456,837 | * 10/1995 | Peachey | 210/512.2 |
| 5,693,225 | * 12/1997 | Lee | 210/512.2 |
| 5,730,871 | * 3/1998 | Kennedy et al. | 210/512.2 |
| 5,762,149 | * 6/1998 | Donovan et al. | 175/40 |
| 5,788,464 | * 8/1998 | Gabelgaard | 417/76 |
| 5,860,476 | * 1/1999 | Kjos | 166/265 |
| 5,879,541 | * 3/1999 | Parkinson | 208/425 |
| 5,996,690 | * 12/1999 | Shaw et al. | 166/250.01 |
| 6,017,456 | * 1/2000 | Kennedy et al. | 210/512.2 |
| 6,033,567 | * 3/2000 | Lee et al. | 210/512.2 |

FOREIGN PATENT DOCUMENTS

WO 94 139030   6/1994 (NO).

OTHER PUBLICATIONS

Kjos, T., et al., "Subsea and DownHole Separation Systems–The Latest advances" Paper XP000671682 READ Process Engineering Norwegian Institute of Technology 1996.*

Offshore (Inc. The Oilman), vol. 55, No. 6, Jun. 1, 1995, p. 16 XP000512449, "Downhold Separator Uses Hydrocyclone, Zone Discharge."

* cited by examiner

Primary Examiner—Thomas B. Will
Assistant Examiner—John Kreck
(74) Attorney, Agent, or Firm—Trask Britt

(57) ABSTRACT

A method of separating oil, water and sand in a production fluid. The production fluid is fed through a downhole liquid/liquid hydrocyclone (9). An oil enriched stream from the hydrocyclone (9) is pumped to the surface, while an oil depleted stream is fed to a downhole solid/liquid hydrocyclone (12). Here, the bulk of the solids is separated from the water, so that water which is substantially free of solids can be transported to a downhole disposal site (14).

12 Claims, 2 Drawing Sheets

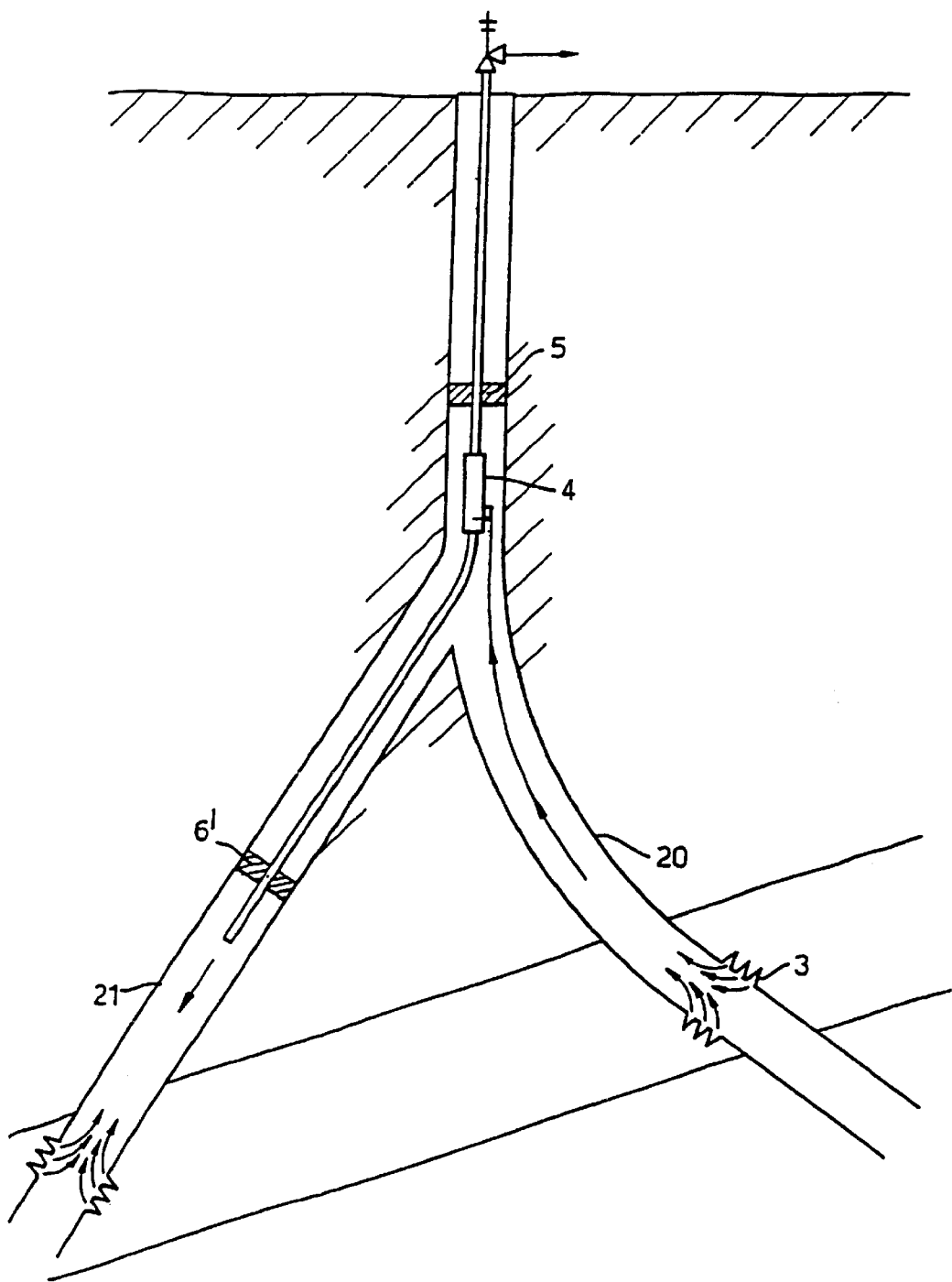

THREE COMPONENT SEPARATION IN AN OIL WELL

BACKGROUND OF THE INVENTION

1. Field of the Invention

The present invention relates to a method of separating production fluid from an oil well.

2. Description of the Related Art

Increasingly, oil producers are looking for ways to produce oil from wells in which the production fluid has a high water cut efficient enough to make the cost of the production economic. One way of achieving this is shown in U.S. Pat. No. 4,738,779, which discloses the use of a liquid/liquid hydrocyclone within a well bore in order to provide initial separation of some of the water from the production fluid to reduce the quantity of production fluid which needs to be transported to the surface. The separated water is returned to the oil reservoir, or to another reservoir which has been exhausted.

BRIEF SUMMARY OF THE INVENTION

According to the present invention, a method of separating oil well production fluid containing oil, water and sand comprises transporting the production fluid to a downhole liquid/liquid hydrocyclone, separating the production fluid in the liquid/liquid hydrocyclone into an oil enriched stream at the hydrocyclone overflow and a water enriched stream at the hydrocyclone underflow, transporting the oil enriched stream to the surface, transporting the water enriched stream to a downhole solid/liquid hydrocyclone, separating the water enriched stream in the solid/liquid hydrocyclone into a solid depleted stream at the overflow and a solid enriched stream at the underflow, and transporting the solid depleted stream to a downhole disposal site.

By providing a solid/liquid hydrocyclone in this way, the method of the present invention ensures that the solid depleted stream which is fed to the disposal site is generally free of solids. This avoids a problem of the prior art, namely the blocking of pores in the rock at the disposal site, which hinders the reinjection of the separated water. Also, in the prior art, in high solids producing wells, the wellbore itself can become blocked below the level of the hydrocyclones.

To some extent, the pressure of the production fluid can be used to drive the two hydrocyclones. However, additional pumps are generally necessary, for example, to pump the production fluid in the line feeding the liquid/liquid hydrocyclone, or to pump the oil enriched stream being transported to the surface.

The solid enriched stream may be disposed of in a suitable underground site. However, preferably, the solid enriched stream is transported to the surface for disposal and/or further treatment. The oil enriched stream and the solid enriched stream may be transported separately to the surface. However, the two streams can be combined to be transported jointly to the surface.

This arrangement forms further aspects of the present invention which can be defined as an apparatus for separating a mixture containing oil, water and sand, the apparatus comprising a liquid/liquid hydrocyclone for separating the mixture into an oil enriched stream at the hydrocyclone overflow and a water enriched stream at the hydrocyclone underflow; a first duct leading from the hydrocyclone overflow for the transport of the oil enriched stream; a second duct leading from the hydrocyclone underflow for the transport of the water enriched stream; a solid/liquid hydrocyclone, fed with the water enriched stream in the second duct, for separating the water enriched stream into a solid depleted stream at the overflow and a solid enriched stream at the underflow; and a third duct leading from the solid/liquid hydrocyclone underflow and joining with the first duct, so that the oil enriched stream and the solid enriched stream are transported together downstream of the joint between the first and third ducts.

The disposal site for the solid depleted stream may be an adjacent reservoir which has been exhausted. Preferably, however, the method of the present invention further comprises drilling two bores from one surface well into the same production formation and installing the hydrocyclones into the well so that the production fluid to be treated is taken from a first bore and the solid depleted stream is returned via the second bore to the formation at a location below that at which the production fluid is removed. This ensures that the bulk of the fluids removed from the formation is returned, so that the formation pressure is maintained and dissolved gas remains in solution. Also, the residual oil in the formation is "swept" towards the first bore.

BRIEF DESCRIPTION OF SEVERAL VIEWS OF THE DRAWINGS

Two examples of an apparatus for separating production fluid with which the method according to the present invention can be performed will now be described with reference to the accompanying drawings, in which:

FIG. 2 is a schematic diagram of a second separating apparatus.

DETAILED DESCRIPTION OF THE INVENTION

Figure 1:
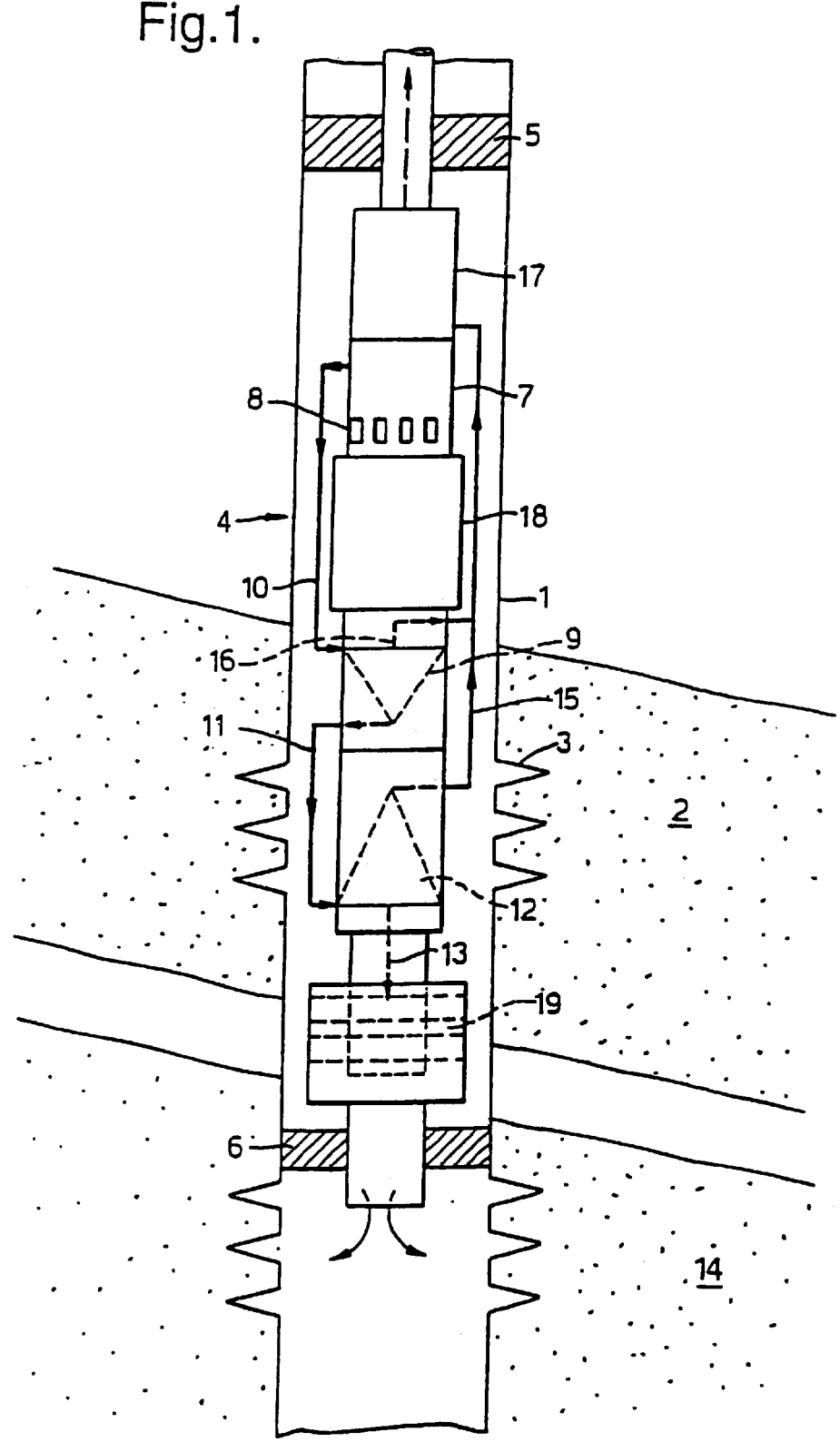
FIG. 1 is a schematic diagram of a first separating apparatus.

As shown in FIG. 1, a well bore casing 1 penetrates into a production formation 2 and is provided with perforations 3 through which production fluid comprising oil, water and sand from the production formation enters the well bore casing 1. Within the well bore casing 1, a separator/pump module 4 is sealed by upper 5 and lower 6 packers.

The separator/pump module 4 comprises a first stage pump 7 which has an intake 8 for the production fluid within the well bore casing 1. The first stage pump 7 pumps the production fluid to a liquid/liquid hydrocylone 9 along an inlet line 10. The mixture being fed to the liquid/liquid hydrocyclone generally has a much larger proportion of water than of oil, so that in the liquid/liquid hydrocylone 9, the mixture is separated so that the bulk of the water, together with the sand, reports to the underflow, while an oil enriched stream reports to the overflow.

The stream from the underflow is fed along the first underflow line 11 to a solid/liquid hydrocyclone 12, in which the solid sand particles are separated from the bulk of the water. The bulk of the water reports to the overflow of the solid/liquid hydrocyclone 12 and flows out along reject line 13, from where it is reinjected into a water disposal zone 14, which may be a part of the production formation, or may be a separate site. As this water is substantially free of solids, problems with clogging the water disposal zone 14 are avoided.

The solid slurry from the underflow of the solid/liquid hydrocyclone 12 is fed along a second underflow line 15, where it is combined with the flow from the overflow of the liquid/liquid hydrocyclone 9 in overflow line 16. The flow from the two lines is pumped to the surface by a second stage pump 17. This second stage pump 17, as well as the first stage pump 7, is driven by a common pump motor 18. The two lines can be readily combined as the pressure drop across the inlet and overflow outlet of the liquid/liquid hydrocyclone 9 is less than or substantially equal to the combined pressure drop across the inlet and underflow outlet of the liquid/liquid hydrocyclone 9 and across the inlet and underflow outlet of the solid/liquid hydrocyclone 12.

A sealed sliding joint 19 is provided between the separator/pump module 4 and the lower packer 6.

At the surface, further processing of the combined oil enriched stream and solid stream is carried out in conventional production facilities.

FIG. 2 shows a modified version of the arrangement shown in FIG. 1. In this arrangement, two bores 20, 21 are drilled from a single surface wellbore. The first bore 20 is provided with production fluid perforations 3 in the production formation, in the same way as FIG. 1. The production fluid is transported to the separator/pump module 4 which is constructed in the same way as that shown in FIG. 1. In FIG. 2, the lower packer 6' is provided in the second bore 21. The bulk of the water, which is substantially free of solids, is produced at the overflow of the solid/liquid hydrocyclone and is fed along the second bore 21 through the lower packer 6' for reinjection into the production formation at a location lower than the location from which the production fluid is extracted. The effect of this is to replace the removed production fluid and sweep the residual oil in the rock towards the production well bore.

What is claimed is:

1. A method of substantially separating oil, water and solid constituents of production fluid from an oil well, comprising:

producing a production fluid including oil, water and solid constituents into a well bore from a production formation;

substantially separating oil, water and solid constituents of the production fluid downhole into an oil enriched stream, a solid depleted stream and a solid enriched stream; and combining the solid enriched stream with the oil enriched stream and pumping the combined streams to the surface.

2. The method of claim 1, further comprising substantially separating the production fluid into an oil enriched stream and a water enriched stream and substantially separating the water enriched stream into the solid depleted stream and the solid enriched stream.

3. The method of claim 2, further comprising transporting the solid depleted stream to a downhole disposal site.

4. The method of claim 2, further comprising effecting the substantial separation of the production fluid into an oil enriched stream and a water enriched stream using a liquid/liquid hydrocyclone, transporting the oil enriched stream from an overflow of the liquid/liquid hydrocyclone and transporting the water enriched stream from an underflow of the liquid/liquid hydrocyclone for substantial separation of the water enriched stream into a solid depleted stream and a solid enriched stream.

5. The method of claim 1, further comprising pumping the production fluid downhole to effect the substantial separation thereof.

6. The method of claim 5, further comprising providing a common drive to effect the pumping of the production fluid and the pumping of the combined oil enriched/solid enriched stream.

7. The method of claim 1, further comprising transporting the solids depleted stream to a downhole disposal site below the location of production of the production fluid.

8. A method of substantially separating oil, water and solid constituents of production fluid from an oil well, comprising:

drilling first and second bores from one surface well into a production formation;

producing a production fluid including oil, water and solid constituents from the first bore;

substantially separating oil, water and solid constituents of the production fluid downhole into an oil enriched stream, a solid depleted stream and a solid enriched stream;

returning the solid depleted stream to the production formation via the second bore at a location below that at which the production fluid is produced from the first bore subsequent to the substantial separation of the oil, water and solid constituents: and, transporting the oil enriched stream to the surface.

9. An apparatus for substantially separating oil, water and solid constituents of production fluid from an oil well downhole, the apparatus comprising:

a liquid/liquid hydrocyclone and a solid/liquid hydrocyclone sized and configured for disposition in combination in a well bore and arranged to substantially separate the production fluid received from a production formation adjacent the well bore into an oil enriched stream, a solid depleted stream and a solid enriched stream;

a first pump having an inlet operably coupled to one of the hydrocyclones for receiving an oil enriched stream therefrom and pumping the oil enriched stream to the surface;

a duct for transporting the solid enriched stream to join with the oil enriched stream prior to a location of receipt of the oil enriched stream by the first pump; and, a second pump having an outlet operably coupled to an inlet of the liquid/liquid hydrocyclone for receiving production fluid and pumping the production fluid downhole to the liquid/liquid hydrocyclone, the liquid/liquid being arranged to receive the production fluid from the second pump and configured to separate the production fluid into the oil enriched stream and a water enriched stream, the solid/liquid hydrocyclone being arranged to receive the water enriched stream and configured to separate the water enriched stream into the solid depleted stream and the solid enriched stream.

10. The apparatus of claim 9, further comprising a common drive source operably coupled to both the first pump and the second pump.

11. An apparatus for substantially separating oil, water and solid constituents of production fluid from an oil well downhole, the apparatus comprising:

a liquid/liquid hydrocyclone and a solid/liquid hydrocyclone sized and configured for disposition in combination in a well bore and arranged to substantially separate the production fluid received from a production formation adjacent the well bore into an oil enriched stream, a solid depleted stream and a solid enriched stream;

a first pump having an inlet operably coupled to one of the hydrocyclones for receiving an oil enriched stream therefrom and pumping the oil enriched stream to the surface; and a duct for transporting the solid enriched stream to join with the oil enriched stream prior to a location of receipt of the oil enriched stream by the first pump.

12. An apparatus for substantially separating oil, water and solid constituents of production fluid from an oil well downhole, the apparatus comprising:

a liquid/liquid hydrocyclone and a solid/liquid hydrocyclone sized and configured for disposition in combination in a well bore and arranged to substantially separate the production fluid received from a production formation adjacent the well bore, wherein the liquid/liquid hydrocyclone is arranged to receive the production fluid and configured to separate the production fluid into an oil enriched stream at an underflow of the liquid/liquid hydrocyclone and a water enriched stream at an overflow of the liquid/liquid hydrocyclone, and wherein the solid/liquid hydrocyclone is arranged to receive the water enriched stream from the liquid/liquid hydrocyclone and configured to separate the water enriched stream into a solid depleted stream at an overflow of the solid/liquid hydrocyclone and a solid enriched stream at an underflow of the solid/liquid hydrocyclone;

a first pump having an inlet operably coupled to the liquid/liquid hydrocyclone for receiving the oil enriched stream therefrom and pumping the oil enriched stream to the surface; and a duct for transporting the solid enriched stream to join with the oil enriched stream prior to a location of receipt of the oil enriched stream by the first pump.

\* \* \* \* \*

UNITED STATES PATENT AND TRADEMARK OFFICE
CERTIFICATE OF CORRECTION

PATENT NO.    : 6,213,208 B1
DATED         : April 10, 2001
INVENTOR(S)   : Frank Skilbeck It is certified that error appears in the above-identified patent and that said Letters Patent is hereby corrected as shown below:

<u>Title page,</u>
Item [56], OTHER PUBLICATIONS, change ""Downhold" to -- "Downhole --

<u>Column 4,</u>
Line 19, change the colon after "constituents" to a semicolon
Line 42, after "liquid" and before "being" insert -- hydrocyclone --

Signed and Sealed this

Twenty-eighth Day of October, 2003

JAMES E. ROGAN
*Director of the United States Patent and Trademark Office*